(12) United States Patent
Xie et al.

(10) Patent No.: US 11,016,803 B2
(45) Date of Patent: May 25, 2021

(54) COORDINATION OF BATCH TRANSMISSIONS AND PROCESSING BETWEEN TRANSMITTING AND RECEIVING COMPUTING SYSTEMS

(71) Applicant: PayPal, Inc., San Jose, CA (US)

(72) Inventors: Kai Xie, Singapore (SG); Chun Kiat Ho, Singapore (SG); Lin Song, Singapore (SG)

(73) Assignee: PayPal, Inc., San Jose, CA (US)

( * ) Notice: Subject to any disclaimer, the term of this patent is extended or adjusted under 35 U.S.C. 154(b) by 147 days.

(21) Appl. No.: 16/233,983

(22) Filed: Dec. 27, 2018

(65) Prior Publication Data

US 2020/0210227 A1 Jul. 2, 2020

(51) Int. Cl.
*G06F 9/48* (2006.01)
*G06F 9/54* (2006.01)

(52) U.S. Cl.
CPC ............. *G06F 9/4881* (2013.01); *G06F 9/54* (2013.01); *G06F 2209/482* (2013.01); *G06F 2209/486* (2013.01)

(58) Field of Classification Search
CPC .... G06F 9/4881; G06F 9/54; G06F 2209/486; G06F 2209/482; G06Q 10/06; G06Q 40/00
See application file for complete search history.

(56) References Cited

U.S. PATENT DOCUMENTS

| | | | |
|---|---|---|---|
| 5,870,722 A | 2/1999 | Albert et al. | |
| 7,155,483 B1 | 12/2006 | Friend et al. | |
| 2007/0208574 A1* | 9/2007 | Zheng | G06Q 10/10 705/1.1 |
| 2008/0091944 A1 | 4/2008 | von Mueller et al. | |
| 2011/0197194 A1 | 8/2011 | D'Angelo et al. | |
| 2014/0310149 A1* | 10/2014 | Singh | G06Q 40/06 705/37 |
| 2014/0344814 A1* | 11/2014 | Jamjoom | G06F 9/50 718/101 |

* cited by examiner

*Primary Examiner* — Eric C Wai

(57) ABSTRACT

Techniques are disclosed relating to coordinating processing data transmissions between computing systems over a network. In various embodiments, a system includes a coordinator that receives information about an expected batch transmission between a data publishing application at a first computing system and a data processing application at a second computing system. Based on the received information, the coordinator determines a time when the data publishing application is expected to publish the batch transmission to the data processing application and causes the second computing system to initiate execution of the data processing application in conjunction with the determined time to receive and process the batch transmission from the data publishing application.

18 Claims, 7 Drawing Sheets

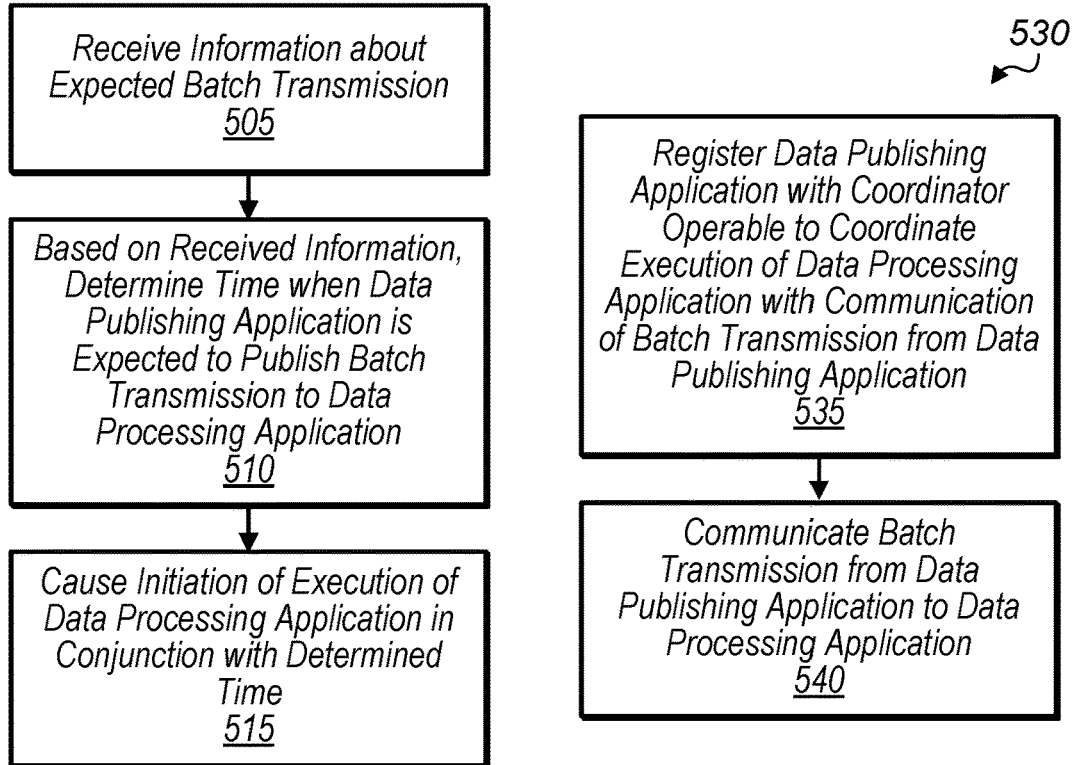
FIG. 5A
FIG. 5B
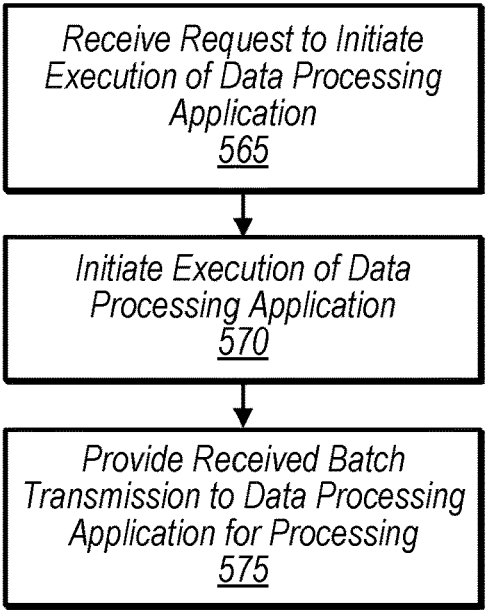
FIG. 5C

COORDINATION OF BATCH TRANSMISSIONS AND PROCESSING BETWEEN TRANSMITTING AND RECEIVING COMPUTING SYSTEMS

BACKGROUND

Technical Field

This disclosure relates generally to computing systems, and, more specifically, to processing communications between applications.

Description of the Related Art

In some instances, a system may rely on a particular application residing at one computing system to process incoming information published by one or more other applications residing over a network at one or more other computing systems. For example, a phone service provider may run a tracking application that analyzes call log information to identify a number of total minutes consumed by a particular user in a given month. This call log data may be provided by a publishing application that aggregates log information from various sources about multiple users and provides this information to the processing application. While a publishing application could generate a transmission for each set of data as it becomes available (e.g., a transmission for each call), this can be impractical, so multiple data sets may be communicated collectively in a batch transmission.

BRIEF DESCRIPTION OF THE DRAWINGS

FIGS. 5A-C are flow diagrams illustrating embodiments of methods for coordinating transmission and processing.

Figure 1:
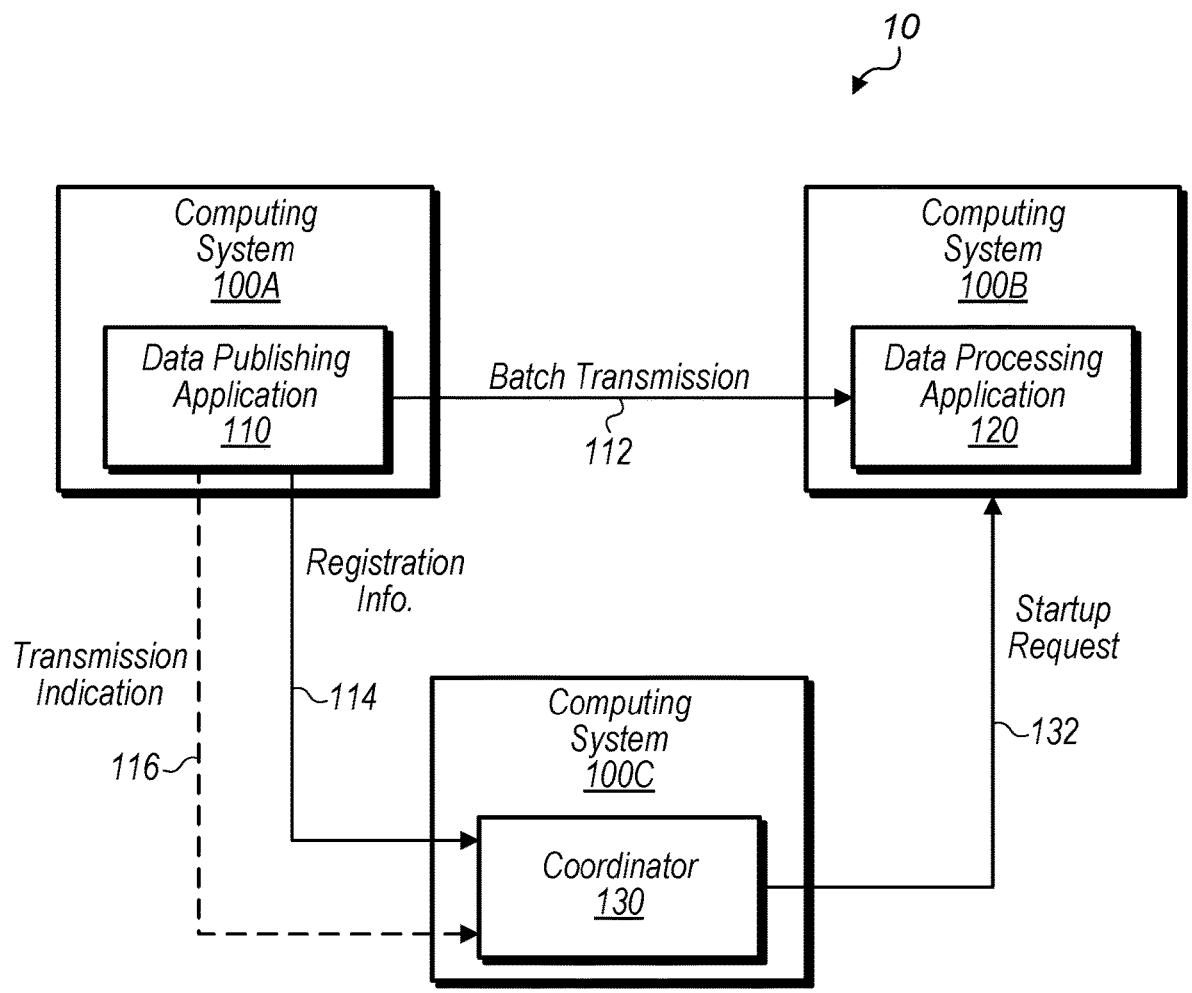
FIG. 1 is a block diagram illustrating one embodiment of a system having a data publishing application, a data processing application, and a coordinator operable to coordinate data transmission and processing.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "temperature circuit configured to measure an internal operating temperature of a processing element" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to" An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a system having multiple computing devices, the terms "first" and "second" computing devices can be used to refer to any two of the computing devices.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, it may be important to process batch transmissions in real time and/or employ stream processing depending on the nature of the data being communicated. Real-time processing, however, can be difficult as resources for processing an incoming batch transaction may need to be available as a batch transmission is being received (or shortly thereafter). Stream processing can also be difficult as the transmissions may occur irregularly and may have an unknown bound/size. For example, data communicated in a batch transmission may be based on user generated events (such as user-generated financial transactions) that occur sporadically and can potentially generate large quantities of data. One approach to processing batch transmissions can include maintaining a system that continuously runs a fully provisioned processing application, so it is constantly available to process any incoming batch transmissions—and handle a worst-case scenario transmission volume. This approach, however, is inefficient as system resources are being consumed by the processing application while it idly waits for potential batch transmissions to process.

The present disclosure describes embodiments in which a coordinator is used to coordinate execution of a data processing application at one computing system with communication of a batch transmission from a data publishing application executing at another computing system. As will be described in greater detail below, in various embodiments, the coordinator can receive information about expected batch transmissions between a data publishing application at a first computing system and a data processing application at a second computing system. For example, the data publishing application may use an application program interface (API) of the coordinator to provide registration information about a set of one or more upcoming batch transmissions. Based on the received information, the coordinator can then determine a time when the data publishing application is expected to publish a batch transmission to the data processing application and cause the second computing system to initiate execution of the data processing application in conjunction with the determined time so that the data processing application is available to receive and process the batch transmission from the data publishing application. For example, the registration information may indicate a time frame when communication of a batch transmission is expected. The coordinator may then determine a time before the indicated time frame in order allow the data processing application to be fully up and running to process the incoming batch transmission in real time. In many instances, coordinating execution of a data processing application in the manner described herein can consume considerably less system resources than maintaining a constantly executing instance of the data processing application. In some embodiments, the coordinator may also ensure that adequate resources are available to process the batch transaction by, for example, instructing the second computing system to assign a particular execution priority level to the data processing application, instructing the second computing system to execute multiple instances of the data processing application, etc.

Still further, in some embodiments, the coordinator may analyze information about previous batch transmissions between the data publishing application and the data processing application. Based on its analysis, the coordinator may adjust when execution the data processing application is initiated in order to more efficiently conserve resources. The coordinator may also determine, based on its analysis, to adjust the resources available for processing the incoming transmission.

Turning now to FIG. 1, a block diagram of a system 10 for coordinating data transmission and processing is depicted. In the illustrated embodiment, system 10 includes a first computing system 100A having a data publishing application 110, a second computing system 100B having a data processing application 120, and a third computing system 100C having a coordinator 130. In some embodiments, system 10 may be implemented differently than shown. Accordingly, system 10 may include one or more additional instances of computing systems 100 and/or applications 110-130—e.g., multiple data publishing applications 110 may interact with a data processing application 120. In some embodiments, coordinator 130 may reside at computing system 100A or computing system 100B (as opposed to a separate computing system 100C as shown in FIG. 1).

Data publishing application 110, in various embodiments, is an application that executes at a first computing system 100A and publishes batch transmissions 112 over a network to another application for processing. These transmissions 112 may occur at any suitable interval (e.g., hourly, weekly, monthly, etc.) and, as noted above, may also occur irregularly—thus potentially having unknown start and/or stop times. Still further, batch transmissions 112 may be communicated as a data stream and have an unknown size that varies over time. For example, data publishing application 110 may send batch transmissions 112 including metadata about various financial transactions that occurred within a given interval and pertaining to various user accounts. As such, the sizes of these transmissions 112 may increase or decrease based on the volume of transactions occurring within a given interval. Although shown as executing on a single computing system 100A, application 110 may, in some embodiments, execute on multiple computing systems 100A, which may implement a cluster. Batch transmissions 112 may also be communicated over any suitable network such as local area network (LAN), wide area network (WAN), the Internet, etc. In some embodiments, batch transmissions 112 may be communicated over a medium other than a computer network such as a message queue, interprocess communication (IPC) system provided by an operating system of the computing system 100, transmission control protocol (TCP) or user datagram protocol (UDP) call stack, etc. For example, in some embodiments, applications 110 and 120 may reside at the same computing system 100 and communicate batch transmissions 112 via localhost TCP ports of the computing system 100. Notably, transmissions 112 are not routed through computing system 100C in the illustrated embodiment—although this may occur in some embodiments.

Data processing application 120, in various embodiments, is an application that executes at a second computing system 100B and processes batch transmissions 112 received from data publishing application 110. Continuing with the example above, data processing application 120 may analyze transaction data included in batch transmissions 112 in real time to identify potential fraudulent transactions. Application 120 may then generate alerts based on the potential fraudulent transactions, which may be displayed in a graphical user interface provided by application 120. Similar to data publishing application 110, data processing application 120 may execute on a single or multiple computing systems 100B. As will be described below with respect to FIGS. 3A and 3B, multiple instances of data processing application 120 may execute within respective containers maintained by computing system 100B. As noted above, execution of data processing application 120 may consume various resources of computing system 100B such as processing resources, memory resources, network resources, etc. Thus, in various embodiments, computing system 100B does not continuously execute data processing application 120, but rather initiates execution of application 120 in conjunction with the communications of batch transmissions 112, which is coordinated by coordinator 130—a lighter weight application than data processing application 120.

Coordinator 130, in various embodiments, is an application that is executable by computing system 100C to determine when batch transmissions 112 are expected to occur and to cause computing system 100B to begin execution of data processing application 120 in conjunction with transmissions 112. In the illustrated embodiment, coordinator 130 initially receives registration information 114 from data publishing application 110, which may be received during a registration process performed before batch transmissions 112 are communicated. This information 114 may include various information usable by coordinator 130 to coordinate execution of application 120 with batch transmissions 112. For example, information 114 may include source information about data publishing application 110 such as an internet protocol (IP) address of computing system 100A as well as a TCP source port number or UDP source port number associated with batch transmissions 112. Information 114 may also include destination information about data processing application 120 such as an IP address of computing system 100B as well a TCP or UDP destination port number associated with data processing application 120. In some embodiments, registration information 114 may also include various timing information usable by coordinator 130 such as a start time (or time frame) when a batch transmission 112 can be expected to occur, a frequency of batch transmissions 112 (e.g., once a week), etc. In some embodiments, registration information 114 may also include various size information about batch transmissions 112 such as an expected size or size range (e.g., between one and two gigabytes), a size classification (e.g., small, medium, or large), etc. In some embodiments, registration information 114 may also specify termination times when batch transmissions 112 are expected to end.

In some embodiments, coordinator 130 may receive information about batch transmissions 112 in addition to registration information 114. For example, in the illustrated embodiment, coordinator 130 receives a transmission indication 116 from data publishing application 110 (or more generally computing system 100A) indicating that it is about to send a batch transmission 112. In some embodiments, computing system 100A may be configured to provide batch transmission 112 in response to computing system 100A initiating execution of data publishing application 110—as batch transmissions 112 may occur shortly thereafter. In another embodiment, computing system 100A may be configured to send indication 116 before a batch transmission 112 in order to merely confirm that application 110 is currently up and running. In some embodiments, coordinator 130 may also receive a transmission indication 116 from data publishing application 110 (or more generally computing system 100A) in response to application 110 determining that batch transmission 112 is about to end (e.g., within the next few seconds).

In various embodiments, coordinator 130 analyzes registration information 114, transmission indications 116, etc. to determine an appropriate startup time when execution of data processing application 120 should be executed. In some embodiments, this startup time may be determined by applying a delay to a received transmission time specified in registration information 114 so that data processing application 120 is running at the specified time. Subsequent startup times may be determined based on a frequency specified in registration information 114 such as adding seven days to the previous execution time if a batch transmission occurs once a week. As will be described below with respect to FIG. 2, coordinator 130 may also determine a shutdown time when execution of application 120 is to be terminated. In some embodiments, this shutdown time may be determined by applying a delay to a termination time specified in registration information 114 (or, in other embodiments, applying a delay after receiving an indication 116 that a batch transmission 112 is ending). In some embodiments, coordinator 130 also determines an expected transmission size for a batch transmission 112, which may be used to determine what appropriate resources may be made available at computing system 100B for processing the transmission 112 (or a shutdown time as just discussed). In some embodiments, coordinator 130 may further use a learning algorithm in which coordinator 130 analyses information about previous batch transmissions 112 to determine when future batch transmissions 112 may occur—as well as their potential sizes.

In the illustrated embodiment, once an appropriate startup time has been determined, coordinator 130 sends a startup request 132 instructing computing system 100B to initiate execution of data processing application 120. In some embodiments, this request 132 is sent at the startup time. For example, coordinator 130 may send request 132 via an API call to an operating system of computing system 100B to cause the operating system to begin executing data processing application 120. In another embodiment, coordinator 130 may send request 132 in advance and specify the appropriate startup time in the request 132. For example, coordinator 130 may sent request 132 to a scheduler of computing system 100B (e.g., by scheduling a cron job) to initiate execution of data processing application 120 at the specified startup time. In some embodiments, request 132 may also specify what resources should be available to application 120 to process an incoming batch transmission 112 such as an execution priority to be applied to application 120, a memory allocation to be given to application 120, a prioritization for managing memory pages of application 120 with respect to a swap space, a network bandwidth or quality of service (QoS) to be applied to traffic of application 120, etc. As will be described with respect to FIGS. 3A and 3B, in some embodiments, request 132 may specify a number of instances of application 120 to be executed within containers maintained by computing system 100B. As will be described below with respect to FIG. 2, in some embodiments, coordinator 130 may also receive workload information from computing system 100B and, based on the workload, instruct data publishing application 110 (or more generally computing system 100A) to adjust its transmission rate for a given batch transmission 112. Accordingly, in some embodiments, coordinator 130 may convey additional information than what is depicted in FIG. 1.

Figure 2:
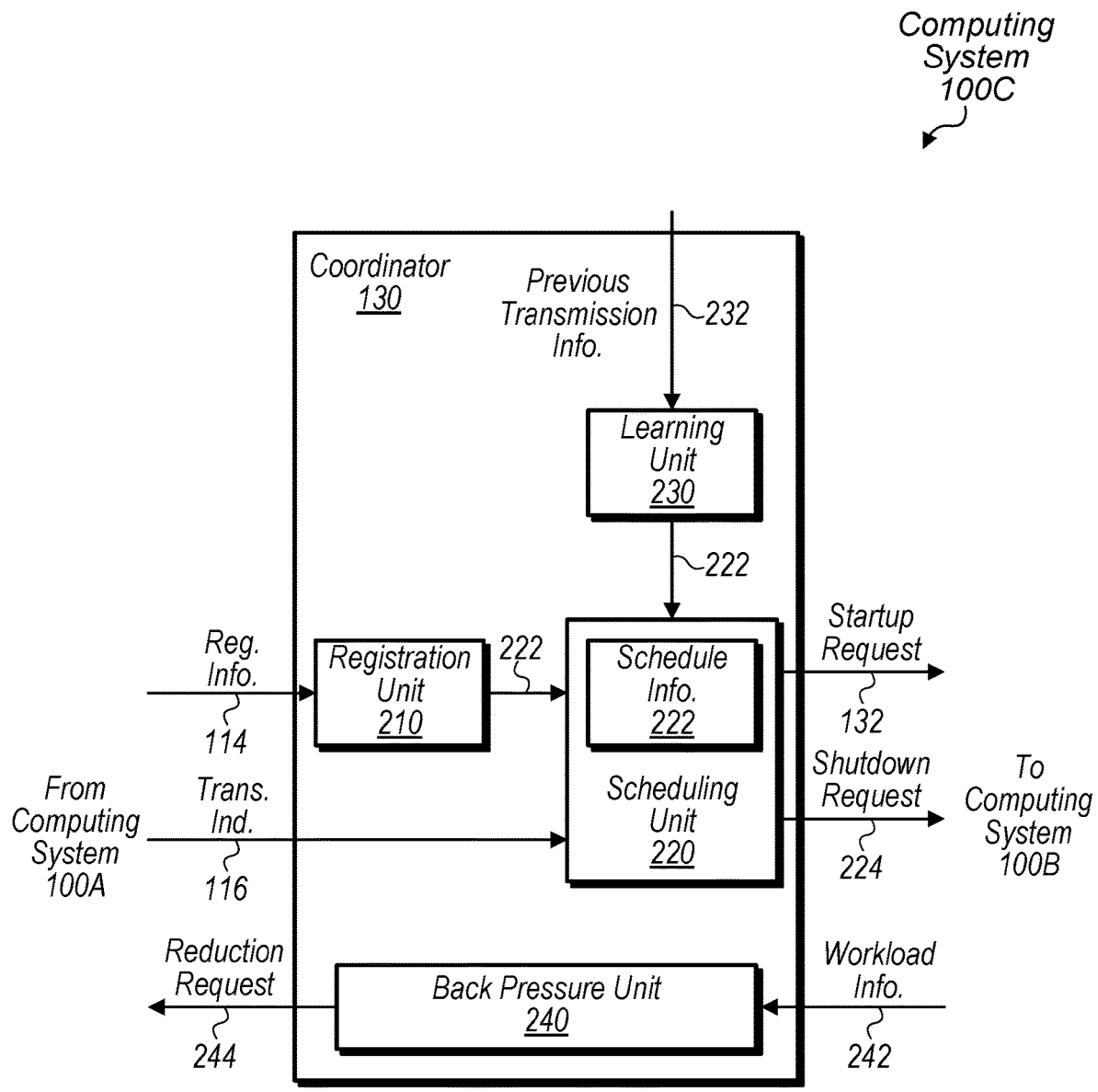
FIG. 2 is a block diagram illustrating one embodiment of the coordinator included in the system.

Turning now to FIG. 2, a block diagram of coordinator 130 is depicted. In the illustrated embodiment, coordinator 130 includes a registration unit 210, a scheduling unit 220, a learning unit 230, and a back pressure unit 240. In some embodiments, however, coordinator 130 may be implemented differently than shown.

Registration unit 210, in various embodiments, includes a set of program instructions executable to perform registration of a data publishing application 110. Accordingly, in some embodiments, registration unit 210 presents an API of coordinator 130 through which registration information 114, transmission indications 116, etc. are received from a data publishing application 110. In some embodiments, registration unit 210 presents a graphical user interface that allows a developer or administrator to input various information such as information 114, 116, etc. In the illustrated embodiment, registration unit 210 provides received information to scheduling unit 220 as schedule information 222. In some embodiments, registration unit 210 may perform processing and analysis of received information before providing schedule information 222 to scheduling unit 220—although this processing and analysis may be performed by scheduling unit 220 or some other unit.

Scheduling unit 220, in various embodiments, includes a set of program instructions executable to maintain schedule information 222 and coordinate execution of data processing application 120 based on information 222. Schedule information 222 may include any various suitable information to facilitate this coordination. In various embodiments, schedule information 222 includes startup times when execution of application 120 is to be initiated. These startup times may then be accessed by scheduling unit 220 when issuing startup requests 132. In some embodiments, schedule information 222 includes shutdown times when execution of application 120 is to be terminated/suspended. Similarly, these shutdown times may be accessed by scheduling unit 220 when issuing shutdown requests 224 instructing to computing system 100B to discontinue execution of data processing application 120. In some embodiments, schedule information 222 may also include various information pertaining to what resources should be allocated during execution to data processing application 120. As discussed above, this information may be included in requests 132 and 224 such as the number of instances of application 120 to deploy within containers as will be discussed below with respect to FIGS. 3A and 3B.

Learning unit 230, in various embodiments, includes a set of program instructions executable to analyze previous transmission information 232 about previous batch transmissions 112 in order to add or adjust schedule information 222. Previous transmission information 232 may be provided by computing systems 100A and/or 100B and may include any suitable data. For example, computing system 100B may provide information 232 indicating when it is receiving batch transmissions 112, and learning unit 230 adjust a startup time for data processing application 120 based on a moving average determined from the reception times of multiple previous transmissions 112. As another example, computing system 100A may provide information 232 indicating the sizes of its transmissions 112. Learning unit 230 may then determine an average size of transmissions 112 and adjust what resources are provided by computing system 100B for processing subsequent transmissions 112. As yet another example, learning unit 230 may adjust shutdown times based on a moving average of previous times when batch transmissions 112 were determined to terminate after a batch transmission 112 is initiated (or after an indication 116 of termination is received from data publishing application 110).

Back pressure unit 240, in various embodiments, includes a set of program instructions executable to regulate a transmission rate of a batch transmission 112 based on a current workload of data processing application 120 (or more generally computing system 100B). In the illustrated embodiment, back pressure unit 240 receives workload information 242 indicative of a current workload such as information regarding processor utilization, memory utilization, network utilization, processing response times, etc. Based on workload information 242, back pressure unit 240 may send a reduction request 244 to computing system 100A instructing it to reduce a transmission rate of a batch transmission 112 in response to information 242 indicating that data processing application 120 (or more generally computing system 100B) is being overloaded. Conversely, back pressure unit 240 may also request that the transmission rate of a batch transmission 112 be increased if additional bandwidth exists to receive and process the batch transmission 112 as indicated by workload information 242.

Figure 3A:
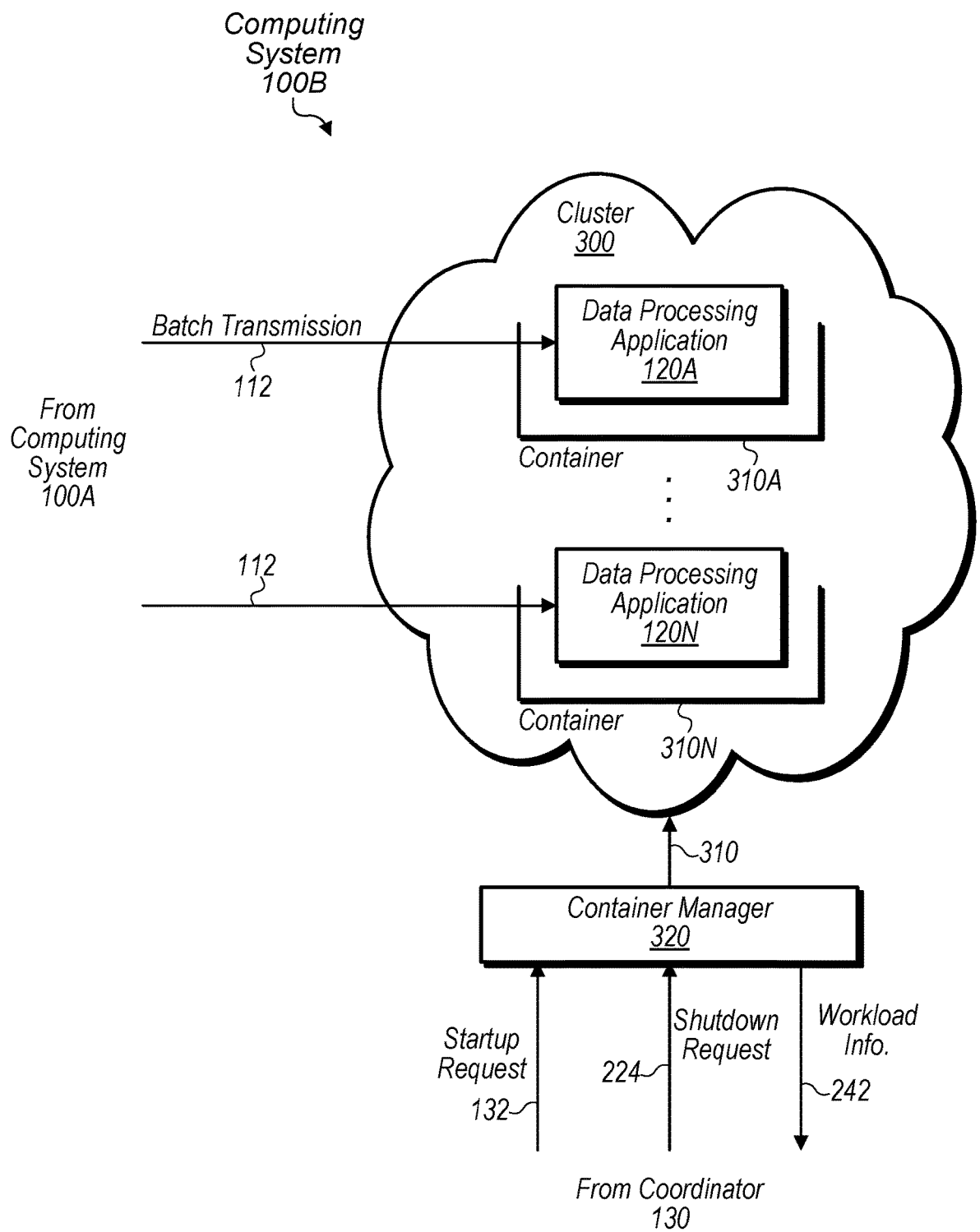
FIGS. 3A and 3B are block diagrams illustrating embodiments of a computing system having a data processing application.

Turning now to FIG. 3A, a block diagram of computing system 100B is depicted. As noted above, in some embodiments, computing system 100B may execute multiple instances of data processing application 120 in order to distribute the processing load of a batch transmission 112. Accordingly, in the illustrated embodiment, computing system 100B includes a cluster 300 of containers 310 including multiple instances of data processing application 120A-N. Computing system 100B also includes a container manager 320. In some embodiments, computing system 100B may be implemented differently than shown. For example, in other embodiments, containers 310 may not be used, a single instance of application 120 may be executed, etc.

Containers 310, in various embodiments, are operable to each maintain a respective instances of data processing application 120. When a given batch transmission 112 is received, computing system 100B may provide a portion of the batch transmission 112 to a given container 310 for processing by its instance of data processing application 120. As demand for processing a given batch transmission 112 changes, more or less containers 310 may be added to or removed from cluster 300 based on the demand. Containers 310 may be implemented using any suitable form of container such as Docker™ container, a virtual machine, hypervisor image, Linux container (LXC), control group (Cgroup), namespaces, etc. Again, computing system 100B may be implemented by a single or multiple computing systems acting together—thus, containers 310 may be collocated at the same computing system 100B or distributed across multiple computing systems 100B. Examples of additional content that may be included in a container 310 are discussed below with respect to FIG. 3B.

Container manager 320, in various embodiments, is executable to manage cluster 300 including containers 310. Accordingly, manager 320 may provision one or more containers 310 in cluster 300 and transition them from a standby state to active state in response to receiving a startup request 132 in order to initiate execution of one or more instances of data processing application 120. In some embodiments, the number of containers 310 transitioned to an active state may be based on a number specified in startup request 132 by coordinator 130. In the illustrated embodiment, manager 320 transitions containers 310 from an active state back to an idle state based on a shutdown request 224 from coordinator 130. In other embodiments, however, manager 320 may determine to shut down containers 310 independently of coordinator 130. In some embodiments, manager 320 also monitors the health of containers 310 including their workloads and may convey corresponding workload information 242 to coordinator 130 to cause a transmission rate of a batch transmission 112 to be adjusted. Container manager 320 may be implemented using any suitable form of container manager such as Kubernetes®, Apache Hadoop® Amazon® Elastic Container Service (ECS), a hypervisor, an operating system, etc.

Figure 3B:
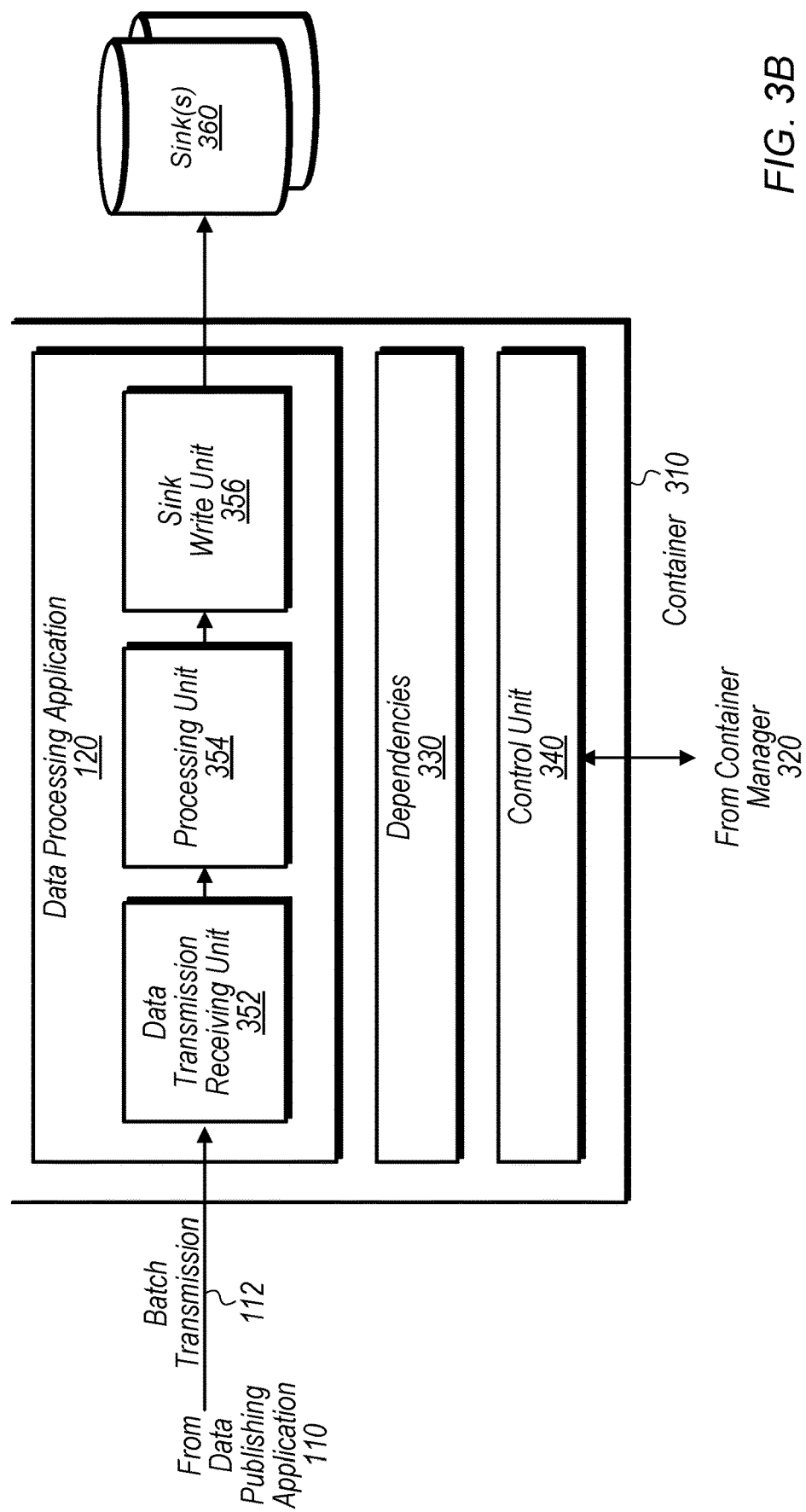

Turning now to FIG. 3B, a block diagram of a container 310 is depicted. As shown, containers 310 may include dependencies 330 and a control unit 340 in addition to data processing application 120. In various embodiments, dependencies 330 may include program instructions for various components relied on by application 120 for execution such as Java® libraries, binary libraries (such as glibc, Linux® kernel, or disk and network resources), etc. For example, dependencies may include program instructions for implementing one or more network layers of the open systems interconnection (OSI) model. In various embodiments, control unit 340 includes program instructions for interfacing with container manager 320. For example, control unit 340 may provide one or more ways (e.g. API, protocol, bash command, etc.) for container manager 320 to start and stop a container 310 (or more specifically data processing application 120). Accordingly, when a container 310 is started in response to a startup request 132, control unit 340 may ask for resources (e.g. memory, disk, network, etc.) from underlying computing system 100B before running application 120. When container 310 is later stopped in response to a shutdown request 224, control unit 340 may release the resources to underlying computing system 100B after shut down of application 120. In some embodiments, container 310 may include more (or less) components than shown.

In the illustrated embodiment, data processing application 120 further includes a data transmission receiving unit 352, processing unit 354, and sink write unit 356. In various embodiments, data transmission receiving unit 352 includes program instructions for receiving an incoming transmission 112, which may include interfacing with one or more lower network stack layers as well as extracting payload content from packets and reformatting the content into a format understandable by processing unit 354. Processing unit 354 may perform processing on the data supplied by unit 352, which may be performed in real-time and/or employ stream processing. Examples of operations performed by processing unit 354 may include mapping, reducing, filtering, aggregating, counting, etc. Sink write unit 356 may collected the processed data from processing unit 354 and output the collected data to one or more external sinks for further consumption. Sinks 360 may include, for example, a Hadoop® file system (HDFS), a file system having binary or plain-text files, a database, or other applications. Writing to sinks 360 may include using an API or protocol, communicating through network (e.g., when sinks reside externally to computing system 100B), etc. In some embodiments, application 120 may include more (or less) components than shown.

Figure 4:
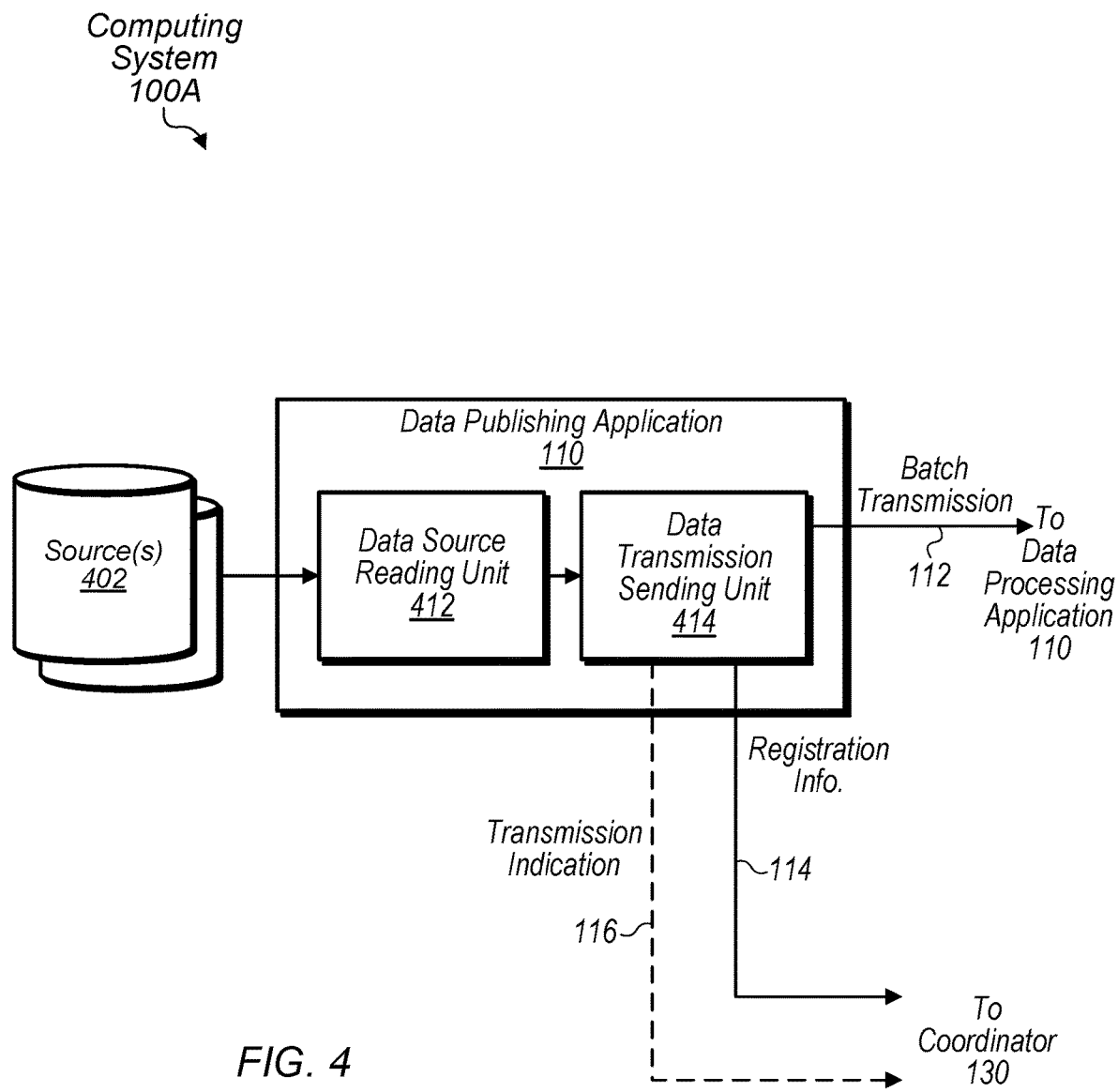
FIG. 4 is a block diagram illustrating one embodiment of a computing system having a data publishing application.

Turning now to FIG. 4, a block diagram of computing system 100A is depicted. In the illustrated embodiment, data publishing application 110 includes a data source reading unit 412 and a data transmission sending unit 414. As shown, in some embodiments, data publishing application 110 may aggregate data from one or more sources 402, which may be handled by data sources reading unit 412. For example, in a system in which data processing application 120 identifies fraudulent transactions, reading unit 412 may access financial information from government sources 402, transaction-log sources 402, law-enforcement sources 402, etc. Sources 402 may be implemented using, for example, HDFS, binary/plain-text files from a file system, databases (such as MySQL® or Teradata®), etc. Data aggregated by reading unit 412 may then be conveyed to data transmission sending unit 414 for communication in batch transmissions 112. In various embodiments, data transmission sending unit 414 may include program instructions for packaging data received from unit 414 into batch transmissions and interfacing with one or more underlying network stack layers of computing system 100A to facilitate transmissions 112. In the illustrated embodiment, data transmission sending unit 414 also provides registration information 114 and/or transmission indication 116 discussed above; however, information 114 and 116 may be provided by some other component of application 110 in other embodiments. In some embodiments, data publishing application 110 may include more (or less) components than shown. For example, data publishing application 110 may include a processing unit that performs one or more processing operations on data from sources 402 before the data is conveyed in batch transmissions 112.

Turning now to FIG. 5A, a flow diagram of method 500 is depicted. Method 500 is one embodiment of a method performed by a computing system executing a coordinator such computing system 100C. In some instances, performance of method 500 may allow a computing system executing a data processing application to conserve resources when batch transmissions are not being communicated.

In step 505, information (e.g., registration information 114) is received about an expected batch transmission (e.g., batch transmission 112) between a data publishing application (e.g., data publishing application 110) at a first computing system and a data processing application (e.g., data processing application 120) at a second computing system. In various embodiments, an initial registration process for the data publishing application is performed prior to the data publishing application publishing a plurality of subsequent batch transmissions, and the registration process includes the receiving of the information. In some embodiments, the received information is usable to determine a plurality of transmission times associated with the plurality of subsequent batch transmissions. In some embodiments, the received information includes a source address associated with the first computing system, a destination address associated with the second computing system, and a time associated with the batch transmission.

In step 510, a time (e.g., schedule information 222) when the data publishing application is expected to publish the batch transmission to the data processing application is determined based on the received information. In some embodiments, the received information identifies the first computing system as a source of the plurality of subsequent batch transmissions and identifies the second computing system as a destination of the plurality of subsequent batch transmissions, and method 500 further includes analyzing ones of the plurality of subsequent batch transmissions (e.g., via previous transmission information 232) to determine a time when another of the plurality of subsequent batch transmissions is expected to be published by the data publishing application.

In step 515, the second computing system is caused (e.g., via a startup request 132) to initiate execution of the data processing application in conjunction with the determined time to receive and process the batch transmission from the data publishing application. In some embodiments, the causing includes instructing an operating system of the second computing system to execute the data processing application. In some embodiments, the causing includes sending a request to a scheduler of the second computing system to schedule execution of the data processing application at the determined time, the request specifying the determined time. In various embodiments, the causing includes instructing the second computing system to deploy one or more containers (e.g., containers 310), each including a respective instance of the data processing application to process the batch transmission. In some embodiments, the causing includes analyzing previous batch transmissions between the first computing system and the second computing system to determine a size of the batch transmission, determining, based on the determined size, a particular number of containers to deploy at the second computing system, and instructing the second computing system to deploy the particular number of containers. In some embodiments, method 500 includes analyzing the previous transmissions to determine a termination time when the batch transmission is expected to end, and based on the determined termination time, instructing (e.g. via shutdown request 224) the second computing system to shut down the deployed one or more containers. In some embodiments, method 500 further includes receiving, from the second computing system, workload information (e.g., workload information 242) identifying a workload associated with the data processing application during processing of the batch transmission and instructing (e.g., via reduction request 244) the first computing system to adjust a transmission rate of the batch transmission.

Turning now to FIG. 5B, a flow diagram of method 530 is depicted. Method 530 is one embodiment of a method performed by a first computing system executing a data publishing application such computing system 100A. In some instances, performance of method 530 may allow a second computing system executing the data processing application to conserve resources when batch transmissions are not being communicated.

In step 535, the first computing system registers a data publishing application (e.g., data publishing application 110) with a coordinator (e.g., coordinator 130) operable to coordinate execution of a data processing application (e.g., data processing application 120) at a second computing system with communication of a batch transmission (e.g., batch transmission 112) from the data publishing application. In various embodiments, the registering includes the first computing system providing registration information (e.g., registration information 114) that is usable by the coordinator to determine a transmission time when the data processing application is expected to receive the batch transmission from the data processing application. In various embodiments, the registration information includes source information associated with the first computing system and destination information associated with the second computing system. In some embodiments, method 530 further includes the first computing system sending, subsequent to the registration and to the coordinator, a notification indicative (e.g., transmission indication 116) of the first computing system initiating the communicating of the batch transmission. In one embodiment, the notification indicates that the first computing system has initiated execution of the data publishing application. In some embodiments, the registration information includes a size of the batch transmission, the size being usable by the coordinator to determine a number of instances of the data processing application (e.g., applications 120A-N) to execute at the second computing system.

In step 540, the first computing system communicates the batch transmission from the data publishing application to the data processing application. In various embodiments, the coordinator instructs the second computing system to initiate execution of the data processing application in conjunction with the determined transmission time. In some embodiments, method 530 further includes the first computing system receiving, from the coordinator, a request (e.g., reduction request 244) to reduce a transmission rate of the batch transmission based on back-pressure information (e.g., workload information 242) provided by the second computing system and the first computing system reducing the transmission rate of the batch transmission based on the request.

Turning now to FIG. 5C, a flow diagram of method 560 is depicted. Method 560 is one embodiment of a method performed by a second computing system executing a data processing application such computing system 100B. In some instances, performance of method 560 may allow conservation of the second computing system's resources when it is not executing the data processing application.

In step 565, a second computing system receives a request (e.g., startup request 132) to initiate execution of a data processing application (e.g., data processing application 120) executable to process a batch transmission (e.g., batch transmission 112) as the batch transmission is being received from a data publishing application (e.g., data publishing application 110) at a first computing system. In various embodiments, the request is received from a coordinator (e.g., coordinator 130) distinct from the first computing system and operable to coordinate execution of the data processing application with communication of the batch transmission. In some embodiments, the request specifies a time when execution of the data processing application is to be initiated. In some embodiments, the request is received based on an expected time when the second computing system is expected to receive the batch transmission, and method 560 further includes the second computing system sending, to the coordinator, an actual time when the batch transmission was received (e.g., previous transmission information 232). In such an embodiment, the actual time is usable by the coordinator to adjust an expected time when the second computing system is expected to receive a subsequent batch transmission from the data publishing application.

In step 570, the second computing system initiates, based on the request, execution of the data processing application. In various embodiments, the initiating includes deploying a cluster (e.g., cluster 300) having a plurality of instances of the data processing application (e.g., applications 120A-N). In some embodiments, the number of deployed instances of the data processing application is specified in the request.

In step 575, the second computing system provides the received batch transmission to the data processing application for processing. In some embodiments, method 560 further includes determining a workload of the data processing application and providing an indication (e.g., workload information 242) of the workload to the coordinator, and the coordinator is operable to adjust a transmission rate (e.g., via a reduction request 244) of the batch transmission based on the workload.

Exemplary Computer System

Figure 6:
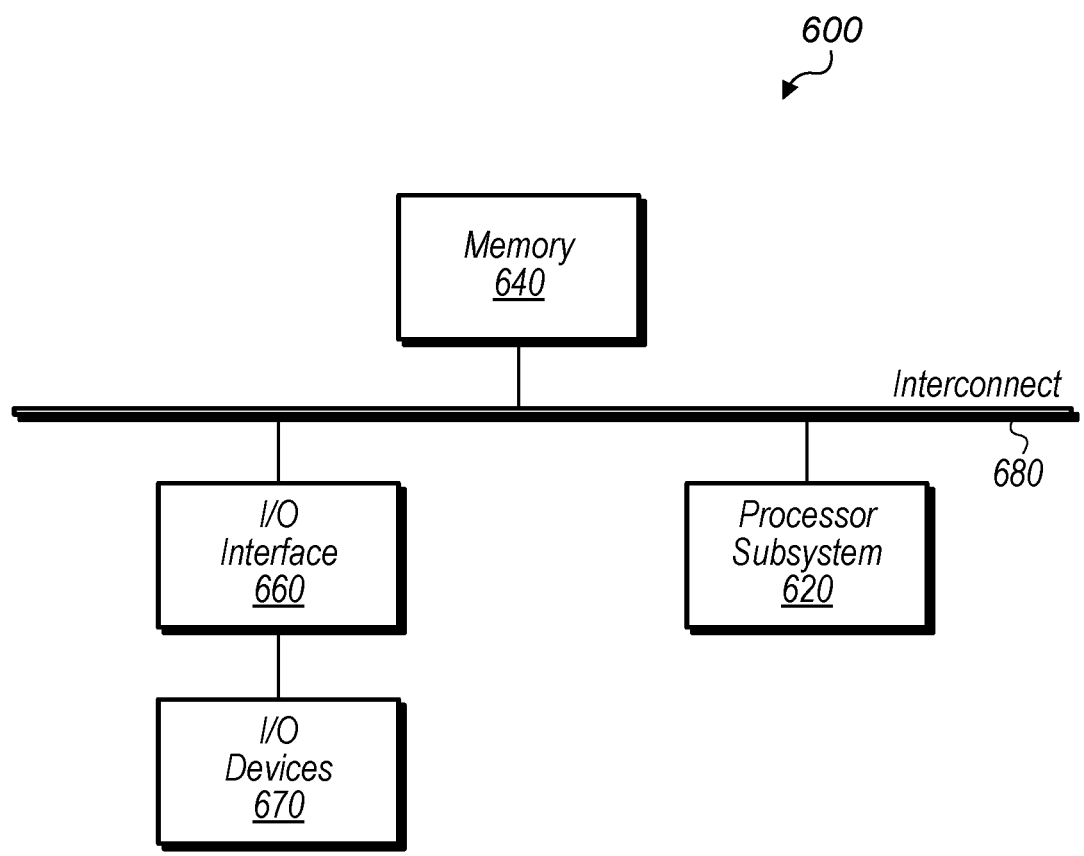
FIG. 6 is a block diagram illustrating one embodiment of an exemplary computer system.

Turning now to FIG. 6, a block diagram of an exemplary computer system 600, which may implement one or more of computing systems 100, is depicted. Computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 620 may include one or more processors or processing units. In various embodiments of computer system 600, multiple instances of processor subsystem 620 may be coupled to interconnect 680. In various embodiments, processor subsystem 620 (or each processor unit within 620) may contain a cache or other form of on-board memory. In one embodiment, processor subsystem 620 may include processor(s) to execute program instructions of applications 110, 120, or 130 described above.

System memory 640 is usable store program instructions executable by processor subsystem 620 to cause system 600 perform various operations described herein. System memory 640 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 600 is not limited to primary storage such as memory 640. Rather, computer system 600 may also include other forms of storage such as cache memory in processor subsystem 620 and secondary storage on I/O Devices 670 (e.g., a hard drive, storage array, etc.). In some embodiments, these other forms of storage may also store program instructions executable by processor subsystem 620. In some embodiments, applications 110, 120, or 130 described above may include (or be included within) system memory 640.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 670 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a computing system to cause the computing system to perform operations comprising:
    receiving information about an expected batch transmission between a data publishing application at a first computing system and a data processing application at a second computing system;
    based on the received information, determining a time when the data publishing application is expected to publish the batch transmission to the data processing application; and
    causing the second computing system to initiate execution of the data processing application in conjunction with the determined time to receive and process the batch transmission from the data publishing application, wherein the causing includes:
        sending a request to a scheduler of the second computing system to schedule execution of the data processing application at the determined time, wherein the request specifies the determined time.

2. The computer readable medium of claim 1, wherein the operations further comprise:
    performing an initial registration process for the data publishing application prior to the data publishing application publishing a plurality of subsequent batch transmissions, wherein registration process includes the receiving of the information, and wherein the received information is usable to determine a plurality of transmission times associated with the plurality of subsequent batch transmissions.

3. The computer readable medium of claim 2, wherein the received information includes a source address associated with the first computing system, a destination address associated with the second computing system, and a time associated with the batch transmission.

4. The computer readable medium of claim 2, wherein the received information identifies the first computing system as a source of the plurality of subsequent batch transmissions and identifies the second computing system as a destination of the plurality of subsequent batch transmissions, and wherein the operations further comprise:
    analyzing ones of the plurality of subsequent batch transmissions to determine a time when another of the plurality of subsequent batch transmissions is expected to be published by the data publishing application.

5. The computer readable medium of claim 1, wherein the causing includes:
    instructing an operating system of the second computing system to execute the data processing application.

6. The computer readable medium of claim 1, wherein the causing includes:
    instructing the second computing system to deploy one or more containers, each including a respective instance of the data processing application to process the batch transmission.

7. The computer readable medium of claim 6, wherein the causing includes:
    analyzing previous batch transmissions between the first computing system and the second computing system to determine a size of the batch transmission;
    based on the determined size, determining a particular number of containers to deploy at the second computing system; and
    instructing the second computing system to deploy the particular number of containers.

8. The computer readable medium of claim 7, wherein the operations further comprise:
    analyzing the previous batch transmissions to determine a termination time when the batch transmission is expected to end; and
    based on the determined termination time, instructing the second computing system to shut down the deployed one or more containers.

9. The computer readable medium of claim 1, wherein the operations further comprise:
    receiving, from the second computing system, workload information identifying a workload associated with the data processing application during processing of the batch transmission; and instructing the first computing system to adjust a transmission rate of the batch transmission.

10. A method, comprising:
a first computing system registering a data publishing application with a coordinator, wherein the coordinator is operable to coordinate execution of a data processing application at a second computing system with communication of a batch transmission from the data publishing application, wherein the registering includes the first computing system providing registration information that is usable by the coordinator to determine a transmission time when the data processing application is expected to receive the batch transmission from the data processing application; and the first computing system communicating the batch transmission from the data publishing application to the data processing application, wherein the coordinator instructs the second computing system to initiate execution of the data processing application in conjunction with the determined transmission time, by sending a request with the determined transmission time to a scheduler of the second computing system to schedule execution of the data processing application at the determined time.

11. The method of claim 10, wherein the registration information includes source information associated with the first computing system and destination information associated with the second computing system, and wherein the method further comprises:
subsequent to the registering, the first computing system sending, to the coordinator, a notification indicative of the first computing system initiating the communicating of the batch transmission.

12. The method of claim 11, wherein the notification indicates that the first computing system has initiated execution of the data publishing application.

13. The method of claim 10, wherein the registration information includes a size of the batch transmission, wherein the size is used by the coordinator to determine a number of instances of the data processing application to execute at the second computing system.

14. The method of claim 10, further comprising:
the first computing system receiving, from the coordinator, a request to reduce a transmission rate of the batch transmission based on back-pressure information provided by the second computing system; and
the first computing system reducing the transmission rate of the batch transmission based on the request.

15. A non-transitory computer readable medium having program instructions stored thereon that are capable of causing a second computing system to implement operations comprising:
receiving, by a scheduler of the second computing device, a request to initiate execution of a data processing application at a determined time specified in the request, wherein the data processing application is executable to process a batch transmission as the batch transmission is being received from a data publishing application at a first computing system, wherein the request is received from a coordinator distinct from the first computing system and operable to coordinate execution of the data processing application with communication of the batch transmission;
based on the request, the scheduler initiating execution of the data processing application at the determined time; and
providing the received batch transmission to the data processing application for processing.

16. The computer readable medium of claim 15, wherein the request is received based on an expected time when the second computing system is expected to receive the batch transmission, and wherein the operations further comprise:
sending, to the coordinator, an actual time when the batch transmission was received, wherein the actual time is usable by the coordinator to adjust an expected time when the second computing system is expected to receive a subsequent batch transmission from the data publishing application.

17. The computer readable medium of claim 15, wherein the initiating includes deploying a cluster having a plurality of instances of the data processing application, wherein the number of deployed instances of the data processing application is specified in the request.

18. The computer readable medium of claim 15, wherein the operations further comprise:
determining a workload of the data processing application; and
providing an indication of the workload to the coordinator, wherein the coordinator is operable to adjust a transmission rate of the batch transmission based on the workload.

* * * * *